290-54 SP
4/21/87 XR RE 32,404

United States Patent [19]

Ferris

[11] E Patent Number: Re. 32,404

[45] Reissued Date of Patent: Apr. 21, 1987

[54] ELEVATOR WITH POWER RECOVERY

[76] Inventor: Loren B. Ferris, 5344 Tyler Ave., Arcadia, Calif. 91006

[21] Appl. No.: 714,166

[22] Filed: Mar. 20, 1985

Related U.S. Patent Documents

Reissue of:

[64] Patent No.: 4,489,812
Issued: Dec. 25, 1984
Appl. No.: 516,031
Filed: Jul. 22, 1983

[51] Int. Cl. ..... F03B 13/00
[52] U.S. Cl. ..... 187/100; 290/54
[58] Field of Search ..... 187/29; 290/43, 54; 318/1

[56] References Cited

U.S. PATENT DOCUMENTS

| | | | |
|---|---|---|---|
| 1,298,032 | 3/1919 | Furlow | 187/29 A |
| 2,669,098 | 2/1954 | Buell | 318/1 X |
| 3,675,112 | 7/1972 | Smith | 290/4 D X |
| 3,952,723 | 4/1976 | Browning | 290/54 X |
| 4,305,003 | 12/1981 | Basurto et al. | 290/54 |
| 4,351,415 | 9/1982 | Kita | 187/29 B |

*Primary Examiner*—William M. Shoop, Jr.
*Assistant Examiner*—W. E. Duncanson, Jr.
*Attorney, Agent, or Firm*—Sellers and Brace

[57] ABSTRACT

Disclosed is a system and method for recovering energy from elevator apparatus and utilizing the recovered energy for useful purposes. This is accomplished by selectively coupling a hydraulic pump to the elevator drive when surplus energy is available thereby to pump and store pressurized fluid in accumulator devices. Such fluid, when above a predetermined pressure, is utilized to deactivate electrically driven units and drive the same by hydraulic motors supplied with fluid from the accumulator devices. Additional energy is recovered from heat present in the hydraulic fluid downstream from the hydraulic pump and utilized beneficially.

24 Claims, 1 Drawing Figure

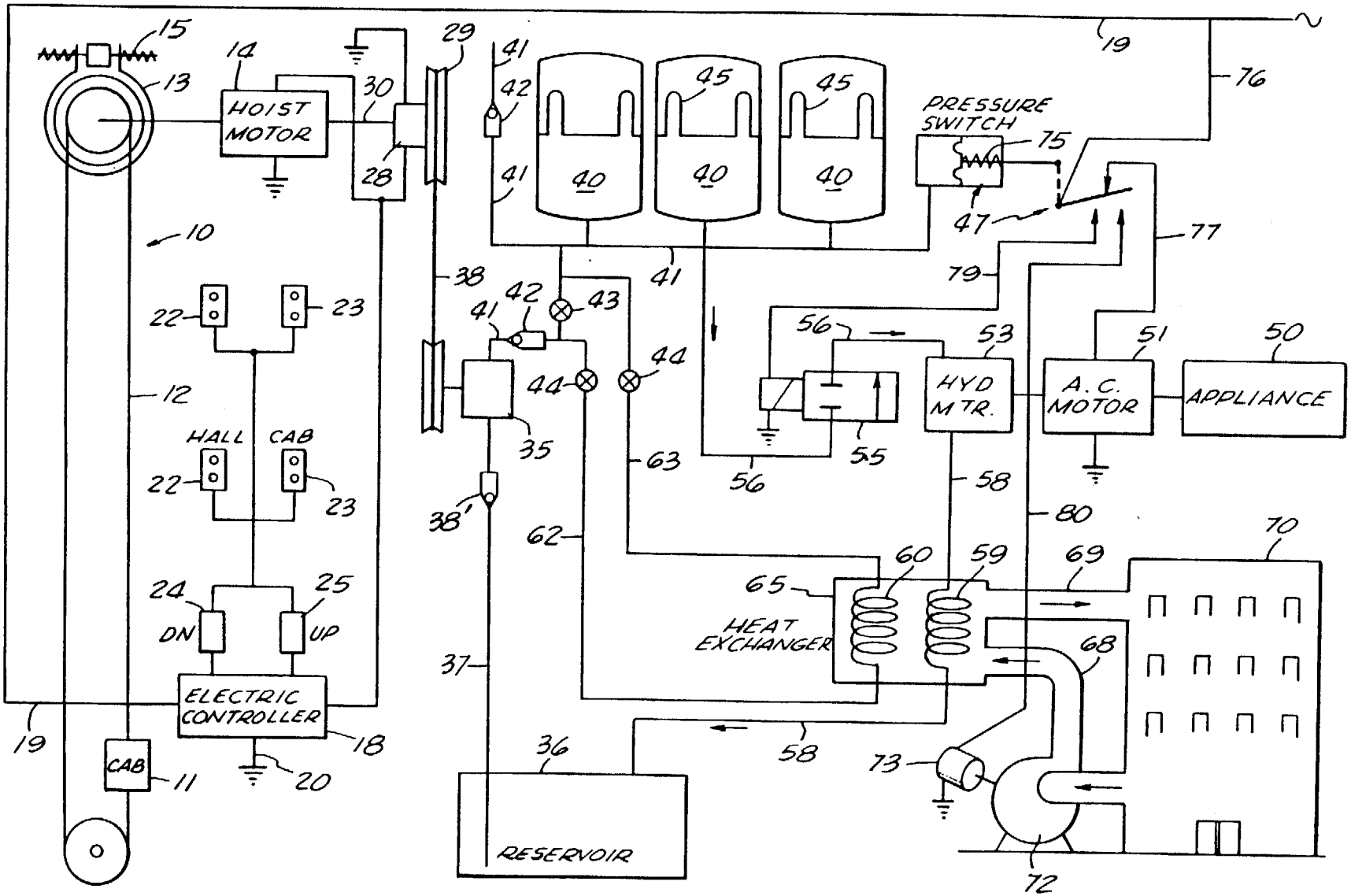
APPLIANCE
A.C. MOTOR
HYD MTR.
PRESSURE SWITCH
HEAT EXCHANGER
RESERVOIR
HOIST MOTOR
ELECTRIC CONTROLLER
CAB
HALL
UP
DN

ELEVATOR WITH POWER RECOVERY

Matter enclosed in heavy brackets [ ] appears in the original patent but forms no part of this reissue specification; matter printed in italics indicates the additions made by reissue.

BACKGROUND OF THE INVENTION

Vast numbers of elevators are in use throughout the world and principally powered either by an electric or a hydraulic drive. Various expedients have been proposed and widely used to conserve the operating energy. In general these utilize counterweights designed to counterbalance the cab system as well as the average load. Also previously proposed are systems for utilizing excess energy in regenerative systems. These systems are complex, costly and servicing presents problems. There has also been proposed by Bailey [Ser. No.] *U.S. Pat. No.* 269,994 [now U.S. Pat. No. 4,375,284,] issued [Mar. 1, 1983] *Jan. 2, 1883* a hydraulic and steam powered drive for an elevator wherein energy stored in a fluid accumulator provides operating energy under average load conditions supplemented, when needed, by steam energy applied to the hydraulically driven pump.

SUMMARY OF THE INVENTION

The numerous shortcomings and disadvantages of prior proposals for recovering energy from elevator operations are avoided by the present invention. This is typically accomplished by way of illustration by optionally connecting a hydraulic pump to the customary elevator drive along with means for activating the drive to the pump when surplus energy from the elevator operation is available. The pump operation is utilized to pressurize and store hydraulic fluid in a band of accumulators and the fluid so acquired is utilized under predetermined pressure conditions to deactivate the supply of electrical power to motor-driven equipment and to substitute a hydraulic motor driven by fluid derived from the accumulators. This drive is maintained until the fluid pressure falls whereupon the electrical drive to the equipment is automatically reactivated. Heat energy present in the pressurized fluid is extracted and imparted to a fluid circulated over a heat exchanger.

Accordingly, it is a primary object of this invention to provide a power recovery system and method operatively associated with elevator apparatus and wherein surplus energy attending elevator operation is utilized to pressurize fluid to deactivate the electric drive for building equipment and to substitute hydraulic drive for this equipment.

Another object of the invention is the provision of a system and method for pressurizing fluid utilizing surplus energy from elevator operations and to utilize the pressurized fluid to power normally electrically powered equipment in a building housing the elevator.

Another object of the invention is the provision of a system for automatically clutching a conventional elevator drive to a hydraulic pump when surplus energy attending elevator operation is available and storing the pressurized fluid for later use to drive other equipment.

These and other more specific objects will appear upon reading the following specification and claims and upon considering in connection therewith the attached drawing to which they relate.

Referring now to the drawing in which a preferred embodiment of the invention is illustrated:

The single FIGURE is a schematic representation of a typical elevator equipped with power recovery means operable to power a normally electrically driven appliance.

The elevator apparatus of conventional design, designated generally 10, appears across the left hand end of the drawing. The apparatus includes a cab 11 suitably suspended for vertical travel as by a cable 12 passing over a hoist drum 13 driven by the hoist motor 14. The hoist drum is equipped with a suitable spring set brake 15 of a type well known to those skilled in the elevator art.

The elevator control system is of conventional design and includes an electric controller 18 connected to a source of power by line 19 and a ground connection 20. The controller is connected to the usual hall and cab call buttons 22-23 via a down relay 24 and an up relay 25. These relays function to control the supply of power through conductors in line 26 leading to hoist motor 14 and to a clutch 28 for pulley 29 both mounted on one end of the hoist motor shaft 30. The function of down relay 24 is to control power to the hoist motor 14 as well as to clutch 28 during downward travel of cab 11, whereas the up relay 25 maintains the power supply to the clutch 28 deactivated except while surplus energy is available as, for example during downward cab travel.

The power recovery components and the connection thereof to selected electrically driven components or appliances in the building served by the elevator will now be described.

A high pressure pump 35 has its inlet connected to a reservoir 36 by conduit 37 provided with a check valve 38'. This pump is driven by belting 38 from the clutch controlled pulley 29 of the hoist motor. The high pressure fluid output of pump 35 is delivered to a bank of accumulators 40—40 via duct 41 having a check valve 42 and a manually controlled valve 43. A branch of line 41 extends to high pressure hydraulic pumps driven by the respective hoist motors of other elevators in the building. These elevators are the same type just described and each has its own clutch-controlled drive 29 for its associated pump 35.

Each of the accumulators 40 is provided with the usual diaphragm separating the high pressure liquid in the lower end of the accumulator from the pressurized gas charge overlying the diaphragm.

The equipment for utilizing the surplus energy derived from the operation of the elevator will now be described. It will be understood that the surplus energy can be used to power any appliance in the building normally powered with electrical energy as, for example, an air conditioner 50 normally driven by motor 51. For this purpose the end of the shaft of motor 51 remote from the appliance is connected to the shaft of a hydraulic motor 53 having its inlet connected by a normally closed solenoid valve 55 to the source of high pressure hydraulic fluid in line 41 via conduit 56. The outlet of motor 53 is connected by conduit 58 to a heat exchanger 59 the outlet of which is in communication with the fluid reservoir 36. A second heat exchanger 60 may be connected in circuit with the pressurized fluid discharging from pump 35 by conduits 62-63 connected to line 41 on the opposite sides of a valve 43. Each of the lines 62 and 63 are also provided with manual valves 44.

When heat exchanger 60 is in use valve 43 is closed and each of the valves 44 are open.

The two heat exchangers 59, 60 are located in a housing 65 here shown as connected by ducting 68, 69 to the space within building 70 to be heated. Air from the building is circulated past the heat exchangers by a blower 72 driven by a motor 73.

The solenoid operated valve 55 controlling the operation of hydraulic motor 53 is connected in circuit with the pressure switch 47. So long as the pressure of the fluid stored in accumulators 40 is below a predetermined pressure the compression spring 75 of pressure switch 47 will hold its switch blade closed upwardly to supply power to the electric motor 51 via conductors 76–77. However, when the fluid pressure in the accumulators is above this predetermined value, switch 75 will rotate clockwise from the position shown thereby interrupting the power supply to appliance motor 51 and closing a power circuit via line 79 to the solenoid of valve 55 whereby opening this valve and supplying the pressurized fluid to the hydraulic motor 53. At the same time switch 47 will close a power circuit to fan motor 73 via conductor 80. So long as the electric motor 51 is operating, the rotor of the hydraulic motor 53 rotates in an idling mode. And so long as motor 53 is operating in a power mode the rotor of motor 51 rotates in an idling mode.

As will be recognized, heat exchanger 59 is always in circuit with warm fluid derived from line 41, whereas heat exchanger 60 is operable to utilize heat energy present in line 41 when valve 43 is closed and valves 44 are both open.

While the particular power recovery system and method for elevator apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in elevator apparatus of the type having power driven means for operating a load lifting device between different floor levels which improvement comprises:

power recovery means for recovering energy from said elevator apparatus during travel of said load lifting device including:

hydraulic pump means having a driving connection to said power driven means for said load lifting device operable to drive said pump means during travel of said load lifting device in at least one direction of travel thereof;

hydraulic fluid accumulator means connected by a conduit to the outlet of said pump means and including means to prevent reverse fluid flow through said pump means when said pump means is not driven;

electric motor driven means normally connected to an electric power source;

hydraulic motor means having a driving connection to said electric motor operable in an idling condition while said electric motor is electrically driven; and means responsive to a predetermined pressure in said accumulator means to deactivate said electric motor and to supply pressurized fluid to said hydraulic motor means from fluid in communication with said accumulator means.

2. That improvement defined in claim 1 characterized in that said fluid pressure responsive means includes a normally closed switch controlling the supply of electric power to said electric motor and operable to cut off said power supply so long as said pressurized fluid remains above a predetermined value.

3. That improvement defined in claim 1 characterized in the provision of heat exchange means connected to warm hydraulic fluid downstream from said hydraulic pump, and the exterior of said heat exchange means being connected in circuit with fluid circulating therepast to extract heat from said warm hydraulic fluid.

4. That improvement defined in claim 3 characterized in that said heat exchange means is in heat exchange with circulating air from a building equipped with said elevator apparatus.

5. That improvement defined in claim 1 characterized in the provision of normally deactivated clutch means in driving connection between said hydraulic pump means and said power driven means for said load lifting device; and control means for said clutch means responsive to travel of said lifting device in at least one direction to activate said clutch means while said lifting device is travelling in said one direction.

6. That improvement defined in claim 1 characterized in that said accumulator means includes a plurality of accumulators connected to the outlet of said hydraulic pump means and to the inlet of said hydraulic motor means.

7. That improvement defined in claim 6 characterized in that said accumulator means include a plurality of accumulators interconnected by a pressurized fluid line adapted to be connected via separate check valve controlled lines to the outlets of respective hydraulic pump means having a clutch-controlled driving connection with the power drive of respective elevator apparatuses.

8. That improvement defined in claim 1 characterized in that said hydraulic pump, said accumulator means and said hydraulic motor are connected in a closed circuit with a reservoir for hydraulic fluid, said closed circuit having check valve means therein positioned in the inlet and outlet sides of said hydraulic pump and operable to trap fluid in said hydraulic pump when the same is not being driven.

9. That method of recovering and utilizing excess energy from [motor-driven elevator] *power-driven load lifting* apparatus which comprises:

utilizing excess energy available in [a motor] *the power* drive for said [elevator] *load lifting* apparatus to drive a hydraulic pump connected to a source of fluid and operable to discharge pressurized fluid into a line connected to fluid storing accumulator means; and utilizing said fluid pressurized above a predetermined value to deactivate [electrically] *power* driven equipment and to substitute a hydraulic drive therefor while the pressure of said pressurized fluid remains above a predetermined value and thereupon restoring said equipment for operation by said [electric] *power* drive.

10. That method defined in claim 9 characterized in the steps of passing said hydraulic fluid through heat exchange means [at point] *connected thereto* downstream from said hydraulic pump, and extracting heat from said hydraulic fluid to heat another fluid in heat exchange with said heat exchange means but out of contact with said hydraulic fluid.

11. That method defined in claim 10 characterized in the step of passing air from a building served by said [elevator] *load lifting* apparatus in heat exchange with a flowing stream of said hydraulic fluid thereby to extract heat therefrom.

12. That method defined in claim 9 characterized in the step of automatically shifting to and fro between [electrical] *power* drive and hydraulic drive of said [electrically] *power* driven equipment in response to a predetermined pressure condition of said pressurized fluid.

13. That improvement in [elevator apparatus] *a load lifting device* of the type having power driven means for operating [a load lifting] *said* device between different floor levels which improvement comprises:

power recovery means for recovering energy from said [elevator apparatus] *load lifting device* during [travel of said load lifting device] *operation thereof* including:

hydraulic pump means having a driving connecti~n to said power driven means for said load lifting device operable to drive said pump means during travel of said load lifting device in at least one direction of travel thereof;

hydraulic fluid accumulator means connected by a conduit to the outlet of said pump means and including means to prevent reverse fluid flow through said pump means when said pump means is not driven;

and means to maintain said hydraulic pump means flooded when not driven by said power driven means for said load lifting device.

14. That improvement defined in claim 13 characterized in that said conduit connecting said hydraulic pump means to said accumulator means includes conduit means provided with normally closed valve means operable when open to return hydraulic fluid to a reservoir.

15. That improvement defined in claim 14 characterized in that said conduit means connecting said hydraulic pump means to said reservoir includes heat exchange means for extracting heat from said hydraulic fluid and for utilizing the extracted heat in a building served by said [elevator] *load lifting device* apparatus.

*16. That improvement in power-driven means for operating a load-lifting device between different levels of a building which improvement comprises:*

*power recovery means for recovering energy from said power-driven means incident to the use of said load-lifting device between said different floor levels;*

*said power recovery means including means operatively connected to said power-driven means for recirculating hydraulic fluid through a flow circuit equipped with fluid pressurizing means, a heat exchanger connected to the outlet side of said fluid pressurizing means and a reservoir for said hydraulic fluid; and*

*means for passing non-hydraulic fluid serving a useful purpose in heat exchange with said heat exchanger to heat said last mentioned fluid.*

*17. That improvement defined in claim 16 characterized in that said fluid pressurizing means includes heat exchange means and accumulator means for storing pressurized hydraulic fluid derived from power recovered from the operation of said energy recovery means in an amount in excess of the immediate needs therefor to heat fluid for use in said building.*

*18. That improvement defined in claim 17 characterized in the provision of automatic control means responsive to a predetermined low pressure of said pressurized hydraulic fluid for deactivating said means for passing non-hydraulic fluid in heat exchange with said heat exchanger means and for reactivating said means for passing non-hydraulic fluid through said heat exchanger means.*

*19. That improvement in power-driven means for operating a load-lifting device between different levels of a building which improvement comprises:*

*power recovery means for recovering energy from said power-driven means incident to the operating of said load-lifting device between said different floor levels; and*

*said power recovery means including means operatively connected to said power-driven means for pressurizing and recirculating pressurized hydraulic fluid through a flow circuit equipped with a hydraulic motor-driven appliance serving a useful purpose in said building and a reservoir for said hydraulic fluid.*

*20. That improvement defined in claim 19 characterized in the inclusion of accumulator means in said hydraulic fluid circuit for storing pressurized hydraulic fluid derived from power recovered from the operating of said energy recovery means in an amount in excess of the immediate needs therefore to drive said motor-driven appliance.*

*21. That improvement defined in claim 20 characterized in the provision of automatic control means responsive to predetermined low pressure of said pressurized hydraulic fluid for deactivating said motor-driven appliance and for restoring the operation hereof when the pressure of said pressurized hydraulic fluid is above said predetermined low pressure.*

*22. That improvement in power-driven means for operating a load-lifting device between different levels of a building which improvement comprises:*

*energy recovery means for recovering energy from said power driven means incident to the use of said load-lifting device between said different floor levels and including means for passing a fluid from said building equipped with said load lifting device in heat exchange with heat inherently produced by the operation of said energy recovery means thereby to make beneficial use of heat produced by the operation of said power-driven means.*

*23. That improvement defined in claim 22 characterized in that said energy recovery means includes a hydraulic fluid pump connected in circuit with a hydraulic fluid reservoir and in heat exchange with fluid from said building.*

*24. That improvement defined in claim 23 characterized in that said energy recovery means includes accumulator means having a hydraulic fluid chamber connected to the outlet side of said hydraulic fluid pump.*

* * * * *

UNITED STATES PATENT AND TRADEMARK OFFICE

CERTIFICATE OF CORRECTION

PATENT NO. : RE. 32,404

DATED : April 21, 1987

INVENTOR(S) : LOREN B. FERRIS

It is certified that error appears in the above-identified patent and that said Letters Patent is hereby corrected as shown below:

Column 6, line 62 et seq., insert the following allowed claims:

25. That improvement defined in claim 22 characterized in that said energy recovery means includes means for circulating air from said building in heat exchange with said energy recovery means thereby to alter the temperature of said air and for then returning said air to said building substantially at said altered temperature.

26. That improvement defined in claim 25 characterized in that said air circulating means has an air inlet and an air outlet in communication with said building and is operable to recirculate air from said building in heat exchange with said energy recovery means.

27. That improvement defined in claim 22 characterized in that said energy recovery means includes means for accumulating excess energy supplied to said power-driven load-lifting device and not consumed in operating the same between different levels; and said energy recovery means including means for utilizing said accumulated excess energy beneficially in said building.

On the title page "24" claims should read --27 claims--.

Signed and Sealed this

Eighth Day of September, 1987

*Attest:*

*Attesting Officer*

DONALD J. QUIGG

*Commissioner of Patents and Trademarks*